March 2, 1943.  R. B. JOHNSTON  2,312,838
HARVESTER THRESHER
Filed Sept. 25, 1940   2 Sheets-Sheet 1
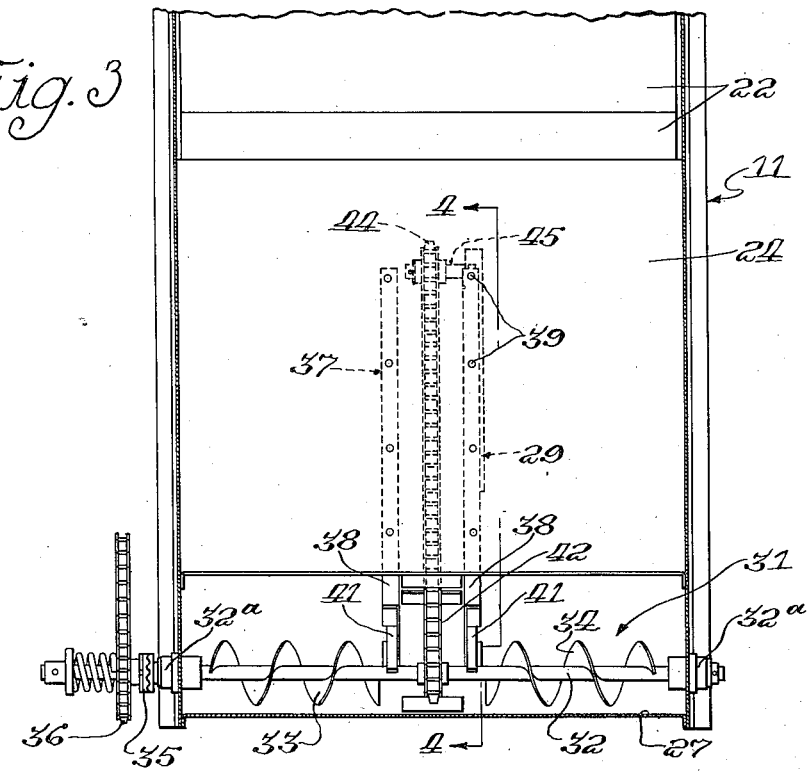
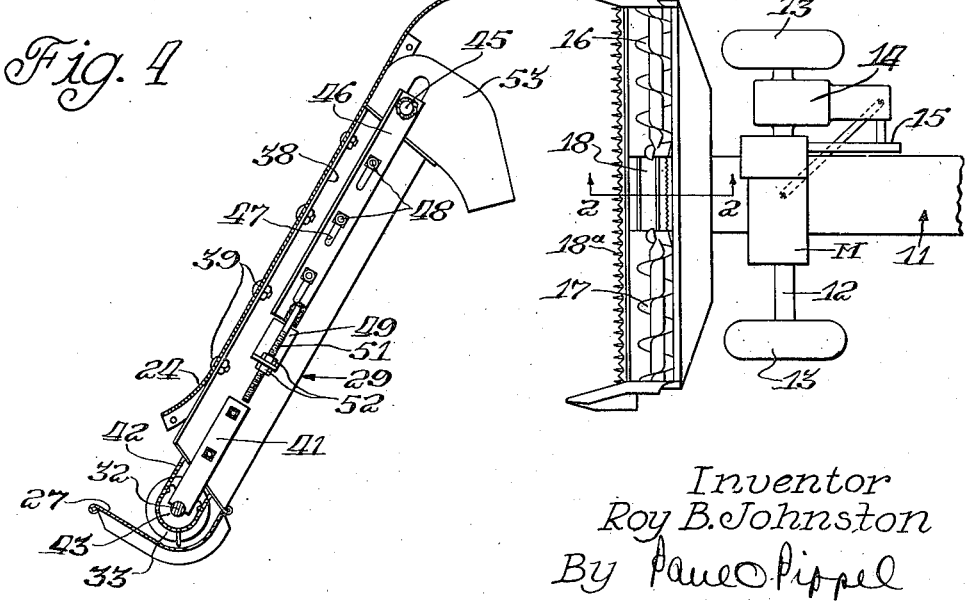
Inventor
Roy B. Johnston
By Paul O. Pippel
Att'y.

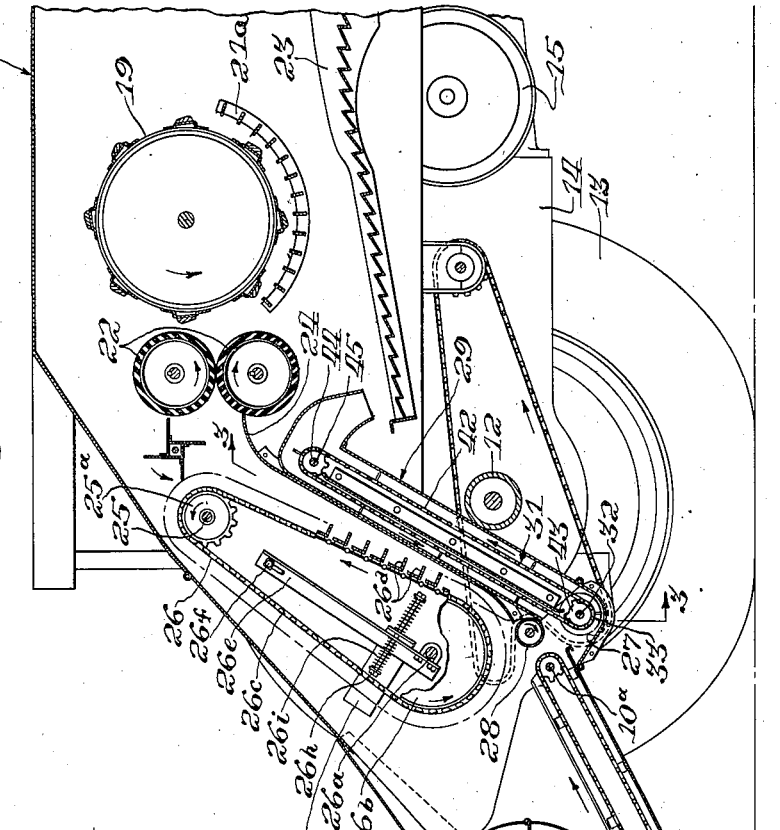

Patented Mar. 2, 1943

2,312,838

UNITED STATES PATENT OFFICE 2,312,838

HARVESTER-THRESHER

Roy B. Johnston, Moline, Ill., assignor to International Harvester Company, a corporation of New Jersey Application September 25, 1940, Serial No. 358,255

9 Claims. (Cl. 130—27)

This invention relates to harvester threshers, and more particularly it relates to improvements in a feeder device therefor.

It has been found that cut grain can be threshed better if it is fed into the threshing cylinder at an even flow. This is done by providing a vertical under-shot conveyor ahead of the threshing cylinder. The vertical under-shot conveyor pivots upwardly, grasps the grain, and compresses it against a conveyor deck which leads the grain into the threshing cylinder. While the under-shot conveyor does efficiently feed the grain evenly into the threshing cylinder, the action of the conveyor against the grain and the conveyor deck threshes some of the grain. Since the under-shot conveyor is disposed vertically, the grain that is threshed by the under-shot conveyor falls down and clogs the feeder conveyor, and also a good deal of the threshed grain is lost.

It is, therefore, the main object of the present invention to provide an improved feeder device for a thresher.

Another object of the invention is to provide a device which will convey all the grain, threshed or unthreshed, into the thresher.

Another object of the invention is to provide a novel elevator structure for conveying threshed grain onto the grain pan of the thresher.

Another object of the invention is to provide an improved means for adjusting the chain of an elevator.

By virtue of these particular objects, an improved thresher feeding device is provided.

According to the present invention, the cut grain is conveyed by a transverse auger conveyor onto a longitudinally disposed feeder conveyor at the rear of which is positioned an under-shot conveyor. This conveyor grasps the grain and moves it rearwardly onto a conveyor deck which leads into the threshing cylinder of the machine. The grain that is threshed by the under-shot conveyor falls downwardly into a trough below the conveyor deck. The trough is provided with right and left-hand conveyor worms which deliver the threshed grain into a threshed grain elevator which is positioned at the center of the conveyor deck. The threshed grain elevator conveys the grain onto the grain pan of the thresher.

These and other objects and advantages of the present invention will be apparent to those skilled in the art after a consideration of the following detailed description of the preferred structural embodiment, taken in conjunction with the accompanying drawings.

In the drawings:

Figure 1 is a top view of the harvester thresher embodying the features of the present invention;

Figure 2 is a sectional view taken along the line 2—2 of Figure 1, showing the feeder conveyor, the under-shot conveyor, and the threshed grain elevator;

Figure 3 is a sectional view taken along the line 3—3 of Figure 2 and shows the threshed grain elevator;

Figure 4 is a sectional view taken along the line 4—4 of Figure 3 and shows the adjusting means for the threshed grain elevator;

Figure 5 is an enlarged sectional view, showing the connection between the feeder conveyor and the front of the harvester thresher; and, Figure 6 is a side view of the screen shown in Figure 5.

Referring now to the drawings and more particularly to Figures 1 and 2, it will be seen that the harvester thresher chosen to illustrate the present invention is of the self-propelled type and comprises a platform or header 10 which is pivotally mounted on the front end of a separator 11, which is supported on an axle structure 12 at the ends of which are mounted supporting wheels 13. A transmission 14 is associated with the axle 12 and is driven from the motor M positioned on the separator 11 through a belt trained around a pulley 15. The platform 10 consists of a right-hand open end auger 16 and a left-hand open end auger 17. Between the inner or open ends of the augers 16 and 17 is positioned a feeder conveyor 18. The usual sickle 18a is provided at the front of the platform 10. A rotatable beater 21 is mounted above the feeder conveyor 18.

As the machine is operated in the field, the sickle 18a cuts the grain, and the augers 16 and 17 convey the grain onto the feeder conveyor 18 which moves the grain rearwardly.

The separator 11 is provided with the usual threshing mechanism in the form of a cylinder 19 which cooperates with a grate bar structure 21a. Forwardly of the threshing cylinder 19 is positioned a pair of rubber rolls 22. Below the rubber rolls 22 and the threshing cylinder 19 is provided the usual reciprocating grain pan 23. Ahead of the rubber rolls 22 extends a forwardly and downwardly positioned conveyor deck in the form of a sheet or partition 24. The upper end of the conveyor deck has an arcuate portion which leads the grain between the rubber rolls 22.

The header 10 is pivotally connected to the front of the separator 11 at the rearmost point of the feeder conveyor 18 at 10a. Any suitable adjusting device may be supplied between the separator and the platform so as to adjust the platform about its pivotal connection 10a to the separator.

Above the conveyor deck 24 is pivotally mounted, on a shaft 25, an under-shot conveyor 26 which extends downwardly and forwardly above the conveyor deck 24. As shown in Figure 2, the lower end of the under-shot conveyor 26 comprises a shaft 26a on which are journaled sprockets 26b. Sprockets 25a are secured on the shaft 25. Chains 26c are trained around the sprockets 25a and 26b, and the usual conveyor flights 26d are provided on said chains. The shaft 26a has secured at the ends thereof an angle member 26e which extends rearwardly and is pivotally connected to the sides of the separator 11 by a bolt 26f. An L-shaped bracket 26g is fixed to each side of the separator 11, and, as shown in Figure 2, extends outwardly under the angle 26e. Alined openings are provided in the bracket 26g and the angle member 26e, through which openings is inserted a bolt 26h. A spring 26i is provided on the bolt 26h so that the shaft 26a may yieldingly rise or fall.

In this way, the lower end of the under-shot conveyor 26 is free to rise and fall, about the bolt 26f as a pivot, toward or away from the conveyor deck 24. As the grain is moved rearwardly by the feeder conveyor 18, the under-shot conveyor 26 grasps the grain and moves it upwardly along the conveyor deck 24 between the rubber rolls 22 and thence into the threshing cylinder 19. A beater 20 is mounted between the upper end of the conveyor 26 and the upper rubber roll 22. In the event that bunches of grain are fed along the feeder conveyor 18, the under-shot conveyor 26 tends to compress these bunches which are then further compressed by the rubber rolls 22 before the grain reaches the threshing cylinder 19. A feeding device of this type is very desirable since the grain is fed to the threshing cylinder in a constant, even flow. However, the under-shot conveyor 26, as it moves the grain into the separator, does thresh some of the grain. The threshed grain falls down the conveyor deck 24 and onto the feeder conveyor 18, and into a trough 27 provided below the lower front end of the conveyor deck 24. The feeder conveyor 18 also empties the threshed grain thereon into the trough 27. The trough 27 is pivotally mounted so that it may be easily opened to be cleaned. A stripper roll 28 is rotatably mounted at the lower end of the conveyor deck 24 so as to prevent the grain from catching thereon. As shown in Figure 3, the trough 27 and the conveyor deck 24 are secured between the sides of the separator 11 and a threshed grain elevator 29 is associated with the trough 27 and is positioned on the under side of the conveyor deck 24. The threshed grain elevator 29 is positioned at the center of the conveyor deck 24, as shown in Figure 3.

Within the trough 27 is provided a grain conveyor worm 31 that consists of a shaft 32 which is journaled in suitable bearings 32a secured in the sides of the separator 11. On the shaft 32 is secured a right-hand and left-hand worm 33 and 34, respectively. The shaft 32 extends beyond one side of the separator 11 and has a slip clutch mechanism 35 mounted thereon, with which is associated a drive sprocket 36. The threshed grain elevator 29 consists of a U-shaped housing member 37. Flanges 38 are provided on the upper edges of the housing member 37 and are bolted to the conveyor deck 24 by bolts 39. At each side of the U-shaped housing 37 is bolted a wooden block 41 which extends downwardly and has a reentrant portion at the end thereof that straddles the shaft 32, so as to maintain the midpoint of the shaft alined with the portion of the shaft journaled in the bearings 33. Within the U-shaped housing 37 is mounted the usual conveyor flight 42 which is trained around a sprocket 43 secured to the shaft 32 and is trained around a sprocket 44 that is journaled on a shaft 45. The shaft 45 is welded to an angle member 46, as shown in Figures 3 and 4. The angle member 46 extends along the side of the U-shaped housing 37 and is provided with a plurality of slots 47 through which extend bolts 48. The bolts 48 also extend through one side of the housing 37. A bracket 49 is secured to the side of the U-shaped housing 37 below the angle member 46. A threaded rod 51, welded to the lower end of the angle member 46 extends downwardly through an opening provided in the bracket 49. Bolts 52 are provided on the threaded rod at each side of the bracket 49. Should it be desirable to tighten the chain of the elevator flights 42, the bolts 48 may be loosened and, by adjusting the bolts 52 on the threaded rod 51, the shaft 45, which is secured to the angle 46, may be moved toward or away from the shaft 32. After the shaft 45 has been adjusted, the bolts 48 are again tightened. At the upper end of the elevator 29 is secured a spout 53 which delivers the grain onto the reciprocating grain pan 23.

As shown in Figure 5, if so desired, a screen 54 may be inserted between the stripper roll 28 and the end of the feeder conveyor 18. The screen 54 is provided with flanges 55 and openings 56. The flanges 55 may be secured to the side of the separator 11 by bolts 55a. By using the screen 54, short pieces of straw which ordinarily would be dumped into the trough 37 by the feeder conveyor 18 are directed by the stripper roll 28 onto the conveyor deck 24. By providing the screen 54, only clean threshed grain is elevated onto the grain pan 23.

From the foregoing description, it is obvious that an improved feeder device has been provided for a thresher. The grain is fed into the separator of the harvester in an even flow by the under-shot conveyor 26. The grain that is threshed by the conveyor 26 is retained in the trough 27 from which it is conveyed onto the grain pan 23. The trough 27 is mounted so that it may be easily opened and cleaned, and the conveyor flight 42 may be quickly and easily adjusted by adjusting the bolts 52.

While a preferred construction, in which the principles of the present invention have been embodied, has been described, it is to be understood that the invention is not to be limited to the specific details shown and described, but that in fact widely different means may be employed in the practice of the broader aspects of the claims.

What is claimed is:

1. For a harvester thresher having a separator in which there is a threshing cylinder and a grain pan and a platform having a feeder conveyor associated with the front of the separator, a conveying means disposed between the feeder conveyor and the threshing cylinder comprising an upwardly and rearwardly extending partition arranged between the sides of the separator and between the rear end of the feeder conveyor and the threshing cylinder, an under-shot conveyor yieldingly mounted above the partition and substantially parallel thereto, a stripper roll positioned at the lower edge of the partition, a trough positioned below the rear end of the feeder conveyor for receiving threshed grain therefrom, an auger conveyor rotatably mounted to operate within the trough, and a conveyor adapted to receive grain from the auger conveyor and extending rearwardly so as to discharge said grain onto the grain pan.

2. In a harvester thresher, a separator having a threshing cylinder, a platform movably mounted on the front of the separator, a feeder conveyor on said platform extending rearwardly toward the separator, an upwardly and rearwardly extending deck sheet positioned between the rear end of the feeder conveyor and the cylinder, an undershot conveyor positioned above the deck sheet and conveying cut grain from the platform conveyor onto the deck sheet and into the threshing cylinder, a stripper roll rotatably mounted at the lower edge of the deck sheet adjacent the rear end of the feeder conveyor, a screen positioned between the rear end of the feeder conveyor and the stripper roll, a trough positioned below the screen for receiving threshed grain from the deck sheet and the rear end of the platform conveyor, and a grain elevator extending from said trough along the under side of the deck for conveying said grain into the separator.

3. In a harvester thresher having a separator provided with a threshing cylinder, a platform movably mounted on the front of the separator, conveying means on the platform extending toward the separator, an upwardly and rearwardly positioned deck sheet positioned at the rear of the conveying means, an undershot conveyor positioned above the deck sheet for conveying cut grain from the platform conveyor onto the deck sheet and into the threshing cylinder, a rotatable stripper roll positioned along the lower portion of the deck sheet, a screen positioned between the rear of the conveying means and the stripper roll, and elevating means positioned below the screen for moving the grain that falls through said screen into the separator.

4. In a construction comprising a separator provided with a threshing cylinder, a deck inclined upwardly toward the threshing cylinder, and a first conveyor for feeding grain to be threshed upwardly along the deck toward the cylinder, the combination therewith of a second conveyor extending from the lower end of the deck therebeneath to the separator for transferring to the separator grain threshed by the first conveyor and fallen to the lower end of the deck.

5. In a construction comprising a threshing cylinder, a grain pan, a deck inclined upwardly toward the threshing cylinder, and a first conveyor for feeding grain to be threshed upwardly along the deck toward the threshing cylinder, the combination therewith of a second conveyor extending from the lower end of the deck therebeneath to the grain pan for moving to the grain pan grain threshed by the first conveyor and fallen to the lower end of the deck.

6. In a construction comprising a separator including a threshing cylinder, a deck inclined upwardly toward the threshing cylinder, and an undershot conveyor for feeding grain to be threshed upwardly along the deck toward the cylinder, the combination therewith of a conveyor extending from the lower end of the deck therebeneath to the separator for moving to the separator grain threshed by the undershot conveyor and fallen to the lower end of the deck.

7. In a construction comprising a threshing cylinder, a grain pan positioned therebeneath, a deck inclined upwardly toward the threshing cylinder, and an undershot conveyor for feeding grain to be threshed upwardly along the deck toward the cylinder, the combination therewith of a conveyor extending from the lower end of the deck therebeneath to the grain pan for moving to the grain pan grain threshed by the undershot conveyor and fallen to the lower end of the deck.

8. In a construction comprising a threshing cylinder, a grain pan, a deck inclined upwardly toward the threshing cylinder, and a first conveyor for feeding grain to be threshed upwardly along the deck toward the threshing cylinder, the combination therewith, of a trough positioned beneath the lower end of the deck and extending from one side thereof to the other, auger means positioned in the trough for moving to the center of the trough grain threshed by the first conveyor and fallen down the deck into the trough, and a second conveyor extending from the center of the trough beneath the deck to the grain for moving the aforesaid threshed grain from the center of the trough to the center of the grain pan.

9. In combination, a threshing cylinder, a grain pan positioned therebeneath, a deck inclined upwardly toward the threshing cylinder, a first undershot conveyor for moving grain to be threshed upwardly along the deck toward the threshing cylinder, a platform positioned adjacent the lower end of the deck, a second conveyor for moving grain to be threshed along the platform to the lower end of the deck, a stripper immediately adjacent the lower end of the deck for assisting the grain to be threshed from the second conveyor on the platform to the deck, and a third conveyor extending from beneath the lower edge of the deck to the grain pan for transferring from the lower edge of the deck to the grain pan threshed grain coming from the second conveyor and grain threshed by the undershot conveyor and falling down the deck.

ROY B. JOHNSTON.